(12) United States Patent
Uehara (10) Patent No.: US 6,369,748 B1
(45) Date of Patent: Apr. 9, 2002

(54) RADAR SYSTEM MOUNTED ON VEHICLE

(75) Inventor: Naohisa Uehara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/576,197

(22) Filed: May 23, 2000

(30) Foreign Application Priority Data

Jan. 19, 2000 (JP) ........................................ 2000-010471

(51) Int. Cl.⁷ .............................................. G01S 13/93
(52) U.S. Cl. ......................... 342/70; 342/104; 342/107; 342/118; 342/128; 342/147; 342/157; 342/158; 342/195; 342/196
(58) Field of Search .............................. 342/70, 71, 72, 342/104, 105, 107–115, 118, 127–135, 175, 195, 147, 155, 157, 158, 69, 196; 701/300–302

(56) References Cited

U.S. PATENT DOCUMENTS

| 5,767,803 | A | * | 6/1998 | Yamada ........................ 342/69 |
| 5,929,803 | A | * | 7/1999 | Uehara et al. ................. 342/70 |
| 6,085,151 | A | * | 7/2000 | Farmer et al. ............... 701/301 |
| 6,218,981 | B1 | * | 4/2001 | Uehara ......................... 342/70 |

FOREIGN PATENT DOCUMENTS

| JP | 7-20016 | 7/1987 | .......... H01Q/25/04 |
| JP | 7-92258 | 4/1995 | .......... G01S/13/44 |

* cited by examiner

Primary Examiner—Bernarr E. Gregory
(74) Attorney, Agent, or Firm—Sughrue Mion, PLLC (57) ABSTRACT

A radar system mounted on a vehicle is capable of properly measuring an angle even when a linearity is impaired without increasing a scale of hardware and a load on signal processing, and exhibiting a high performance at a low cost. This system is constructed of a transmit-receive shared antenna including a transmitting means for transmitting electromagnetic waves subjected to plural kinds of frequency modulations and a receiving means for receiving the receiving electromagnetic waves reflected by a target object, a signal processor for calculating a relative distance and a relative velocity to the target object and a receiving intensity on the basis of output data from the transmitting means and input data from the receiving means, and calculating a direction of the target object from the receiving intensity, and an antenna scan motor as a scan means, for deflecting a transmitting direction of the transmitting means and a receiving direction of the receiving means on the basis of an output from the signal processor. The signal processor executes an angle measuring process based on a combination of the receiving intensities in respective frequency-modulated phases in the plurality of directions, and uses what averages respective measured angle values as a result of measuring the angle.

2 Claims, 6 Drawing Sheets

RADAR SYSTEM MOUNTED ON VEHICLE

BACKGROUND OF THE INVENTION

1. Field of the Invention

The present invention relates to a radar system mounted on a vehicle, which is suitable for use as a car-to-car distance measuring system for a vehicle.

2. Description of the Related Art

This type of known radar system may be an FMCW (Frequency Modulated Continuous Wave) radar system downsized by use of a transmit-receive shared antenna, of which a mountability on an automobile is thereby enhanced.

Figure 5:
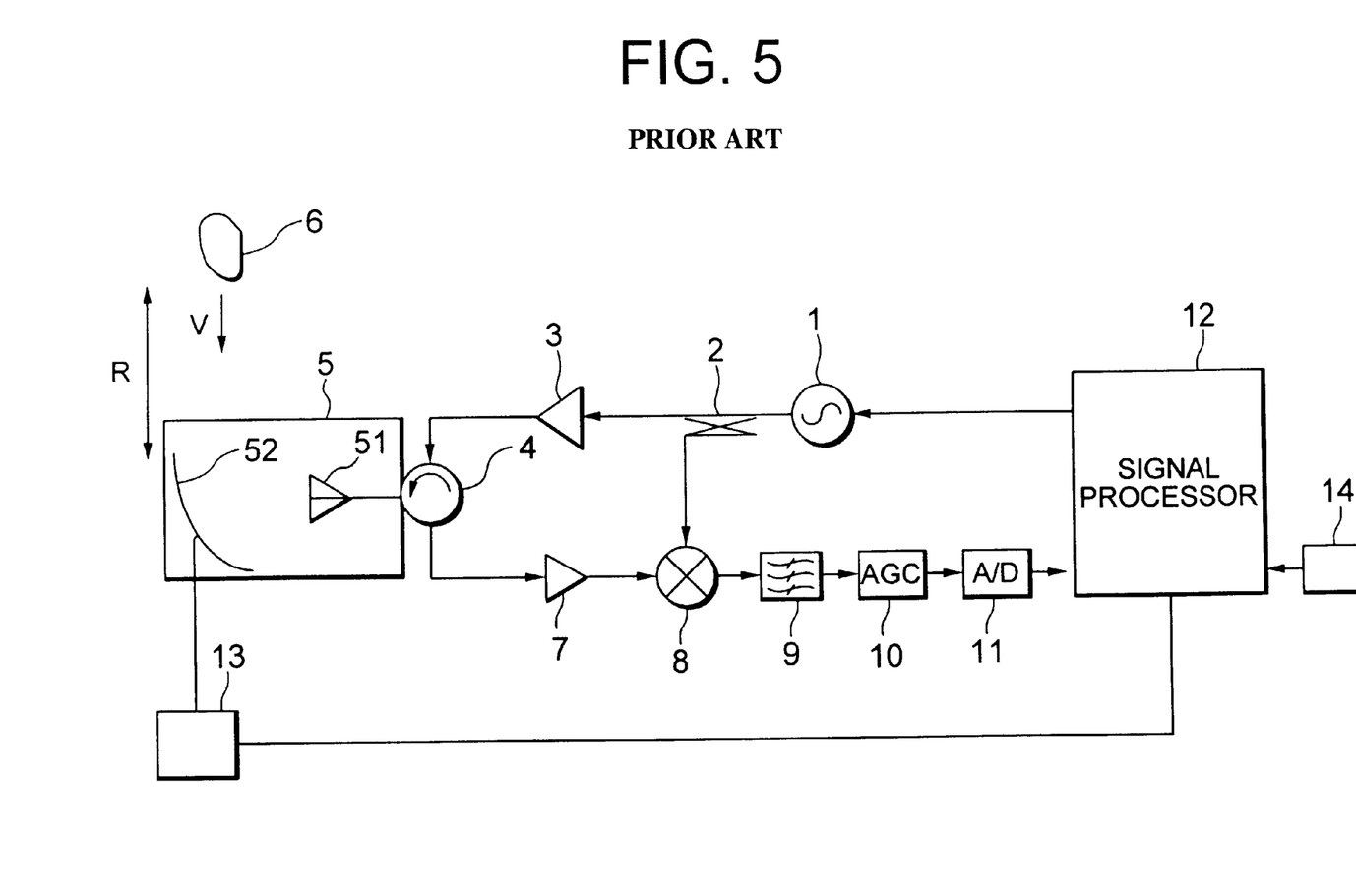
FIG. 5 is a block diagram showing a configuration of a prior art radar system mounted on a vehicle.

FIG. 5 is a block diagram showing a configuration of the conventional FMCW radar system.

Referring to FIG. 5, there are shown an oscillator 1, a power divider 2, a transmitting amplifier 3, a circulator 4, a transmit-receive shared antenna 5 including a horn antenna 51 and a reflection mirror antenna 52, a target object 6, a receiving amplifier 7, a mixer 8, a filter 9, an AGC (Automatic Gain Control) amplifier 10, an AD (Analog-to-Digital) converter 11, a signal processor 12, an antenna scan motor 13 for deflecting a transmitting direction and a receiving direction of the transmit-receive shared antenna 5 on the basis of an output given from the signal processor 12, and an handle angle sensor 14.

Next, an operation of the thus constructed prior art radar system mounted on the vehicle will be explained.

The signal processor 12 outputs a linear voltage signal for a frequency modulation. With this frequency modulation voltage signal, the oscillator 1 generates frequency-modulated electromagnetic waves. The power divider 2 divides the electromagnetic wave into two groups of electromagnetic waves. One group of electromagnetic waves are inputted to the mixer 8, while the other group of electromagnetic waves, after being amplified by the transmitting amplifier 3, arrive at the transmit-receive shared antenna 5 via the circulator 4 and are outputted into the air space from this antenna 5.

The electromagnetic waves outputted into the air space from the transmit-receive shared antenna 5, are reflected by the target object 6 and inputted back to the transmit-receive shared antenna 5 with a delay time Td with respect to the transmitting electromagnetic waves. Further, if the target object 6 has a relative velocity, the receiving electromagnetic waves are inputted to the transmit-receive shared antenna 5 with a Doppler shift Fd with respect to the transmitting electromagnetic waves. The electromagnetic waves received by the transmit-receive shared antenna 5 are, after being amplified by the receiving amplifier 7, mixed with the transmitting electromagnetic waves by the mixer 8, thereby outputting beat signals corresponding to the delay time Td and the Doppler shift Fd. The obtained beat signals are transmitted through the filter 9 and, after being amplified by the AGC amplifier 10, inputted to the AD converter 11. The signal processor 12 calculates a relative velocity and a relative distance to the target object 6 from the beat signals.

Next, a method by which the signal processor 12 calculates the relative velocity and the relative distance to the target object 6, will be put into discussion.

Figure 6:
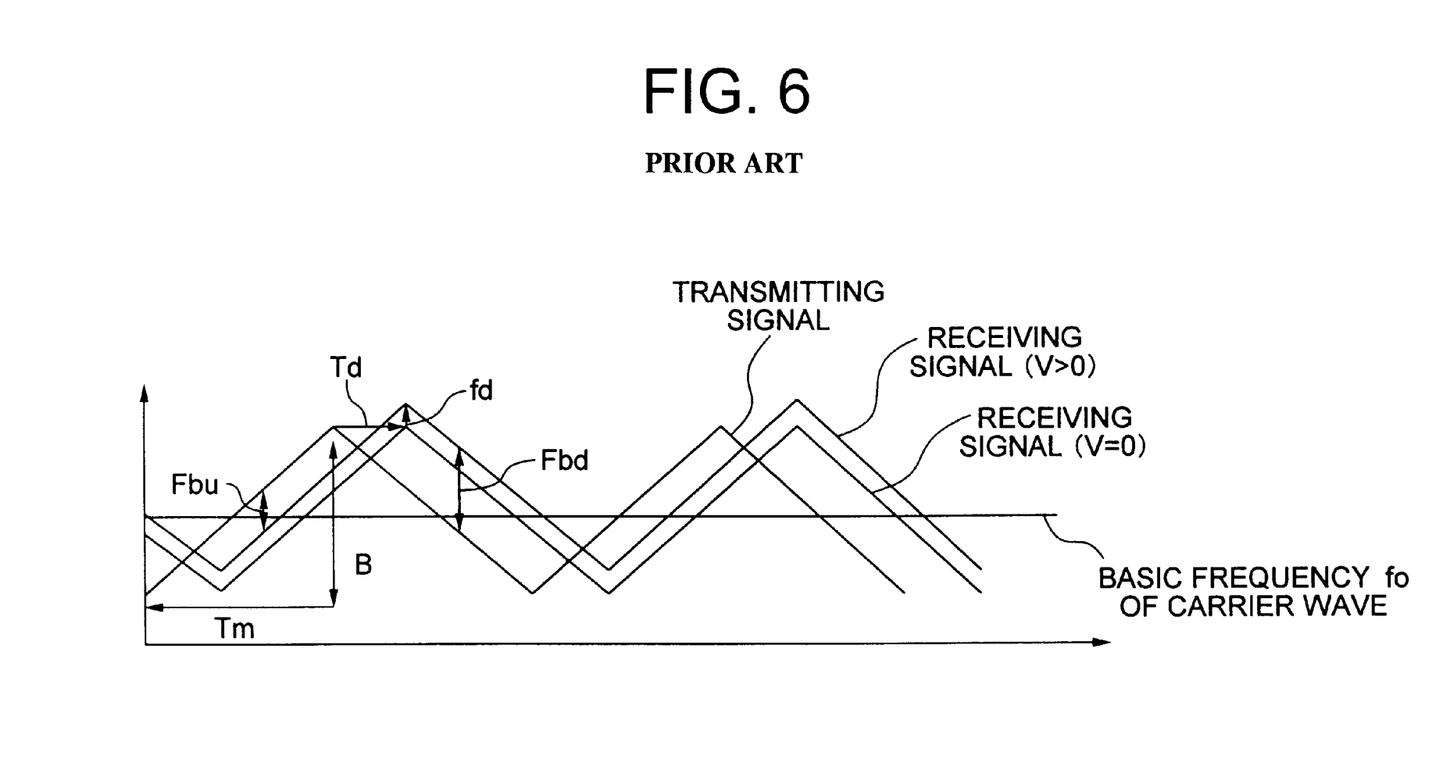
FIG. 6 is an explanatory graph showing a method of calculating a relative distance and a relative velocity by the prior art radar system mounted on the vehicle.

FIG. 6 is an explanatory diagram showing one example of calculating the relative distance and the relative velocity by use of the radar system mounted on the vehicle.

Referring to FIG. 6, the transmitting signal is frequency-modulated with a frequency sweep bandwidth B at a modulation cycle Tm. The receiving signal has the delay time Td till the transmitting signal is inputted to the transmit-receive shared antenna 5 since the transmitting signals have been reflected by the target object 6 existing at, e.g., a distance R. Further, if the target object 6 has a relative velocity, the receiving signal is Doppler-shifted by a frequency fd with respect to the transmitting signal.

In this case, the mixer 8 outputs, as beat signals, a frequency difference Fbu between the transmitting signal and the receiving signal when the frequency rises, and a frequency difference Fbd between the transmitting signal and the receiving signal when the frequency lowers. The signal processor 12 takes in those beat signal as pieces of data via the A/D converter 11, and executes an FFT (Fast Fourier Transformation) process on these pieces of data, thereby obtaining the frequency differences Fbu, Fbd and receiving intensities Mu, Md. The receiving intensities Mu, Md of the frequency differences Fbu, Fbd are generally the same, and hence an average value M thereof is given such as M=Mu=Md.

The relative distance R and the relative velocity V of the target object 6 are given by the following formula $$R = \frac{TmC}{4B}(Fbu + Fbd), V = \frac{\lambda}{4}(Fbu - Fbd) \quad (1)$$

where Fbu, Fbd are the frequency differences, B is the frequency sweep bandwidth, Tm is the modulation cycle, C is the light velocity (=3.0×10$^8$ m/s), and λ is the wavelength of the carrier wave (λ=4.0×10$^{-3}$ m, if the carrier wave basic frequency F$_o$=77 GHz).

Further, if a plurality of target objects 6 exist, the frequency differences Fbu, Fbd of the same object are elected from the plurality of frequency differences Fbu between the transmitting signals and the receiving signals when the frequencies rise, and the plurality of frequency differences Fbd between the transmitting signals and the receiving signals when the frequencies lower, and the relative distance R and the relative velocity V are obtained from the formula (1).

Given next is an explanation of a method by which the signal processor 12 calculates a direction of the target object 6 from the receiving intensity M.

For instance, Japanese Examined Patent Publication No. Hei 7-20016 discloses typical systems such as a mono-pulse system, a sequential lobing system and a conical scan system as conventional methods of calculating the direction. The sequential lobing system among those systems is herein described.

The signal processor 12 measures a relative distance, a relative velocity and a receiving intensity M1 in a predetermined direction θ1, and thereafter operates the antenna scan motor 13 to make a shift to a next direction θ2. The signal processor 12 similarly measures a relative distance, a relative velocity and a receiving intensity M2. Data about the same relative distance and relative velocity are chosen among pieces of detection data in the plurality of directions, and an angle can be measured basically from a relationship in magnitude between the receiving intensity M1 and the receiving intensity M2.

To be more specific, a sum pattern S(θ) and a difference pattern D(θ) are obtained from antenna beam patterns B1(θ), B2(θ) in the predetermined two directions θ1, θ2 by the following formulae (2) and (3):

$$S(\theta) = B1(\theta) + B2(\theta) \quad (2)$$

$$D(\theta) = B1(\theta) - B2(\theta) \quad (3)$$

Next, a discriminator $DS(\theta)$ shown in the following formula (4), which is standardized by the sum pattern $S(\theta)$, is obtained.

$$DS(\theta)=D(\theta)/S(\theta) \qquad (4)$$

Subsequently, the discriminator $DS(\theta)$ shows a relationship of simple increment or simple decrement with the measured angle value $\theta$ within a half-value width $\theta s$ of the sum pattern $S(\theta)$.

An angle $\theta n$ at which a central angle $\theta o$ in the predetermined two directions $\theta 1$, $\theta 2$ is standardized by the half-value width $\theta s$ of the sum pattern $S(\theta)$, is given by the following formula (5). An inclination k of the discriminator $DS(\theta)$ in the vicinity of $\theta n=0$, is given by the following formula (6).

$$\theta n=(\theta-\theta o)/\theta s \qquad (5)$$

$$k=DS(\theta)/\theta n \qquad (6)$$

Furthermore, the discriminator DS obtained by observation from the receiving intensities M1 and M2 is obtained from the following formula (7):

$$DS=(M1-M2)/(M1+M2) \qquad (7)$$

Hence, the measured angle value $\theta$ can be obtained by the following formula (8) from the half-value width $\theta s$, the inclination k and the angle $\theta o$ which can be calculated beforehand, and from the discriminator DS obtained by observation.

$$\theta=\theta s/k \cdot DS+\theta o \qquad (8)$$

Whether or not the target object 6 is a car traveling ahead of the self-car on the same lane, is judged based on a road curvature obtained by the handle angle sensor 14 as well as on the angle, the relative velocity and the relative distance to the target object 6 which have been measured as described above. There are carried out a car-to-car distance alarm and a chasing travel to keep a safe car-to-car distance.

When calculating the relative distance and the relative velocity in the prior art radar system mounted on the vehicle, however, if a linearity of frequency modulation in FIG. 6 is impaired, the receiving intensities M of the beat frequencies Fbu, Fbd are influenced by the linearity with an error in frequency, and therefore take the different values Mu, Md. As a consequence, an measured angle value also has an error, resulting in such a problem in terms of a system operation as to be incapable of properly recognizing a car traveling ahead and an obstacle as well.

The error might be reduced if the linearity is enhanced. The enhancement of the linearity, however, necessitates increasing a scale of the hardware and a load on signal processing. This can not be attained in terms of costs and operating conditions of an automobile.

SUMMARY OF THE INVENTION

The present invention has been made to solve the problems described above, and therefore has an object to provide a radar system mounted on a vehicle, capable of properly measuring an angle even when a linearity is impaired without increasing a scale of hardware and a load on signal processing and exhibiting a high performance at a low cost.

To accomplish the above object, according to one aspect of the present invention, a radar system mounted on a vehicle comprises a transmitting means for transmitting electromagnetic waves subjected to plural kinds of frequency modulations, a receiving means for receiving the receiving electromagnetic waves reflected by a target object, a signal processing means for calculating a relative distance and a relative velocity to the target object and a receiving intensity on the basis of a transmitting signal of the transmitting means and a receiving signal of the receiving means, and calculating a direction of the target object from the receiving intensity, and a scanning means for deflecting a transmitting direction of the transmitting means and a receiving direction of the receiving means on the basis of an output given from the signal processing means, characterized in that the signal processing means executes an angle measuring process based on a combination of the receiving intensities in respective frequency-modulated phases in the plurality of directions.

This radar system mounted on the vehicle is characterized in that the signal processing means determines an average of respective measured angle values.

DESCRIPTION OF THE PREFERRED EMBODIMENTS

Embodiment 1

An embodiment 1 of the present invention will hereinafter be described.

Figure 1:
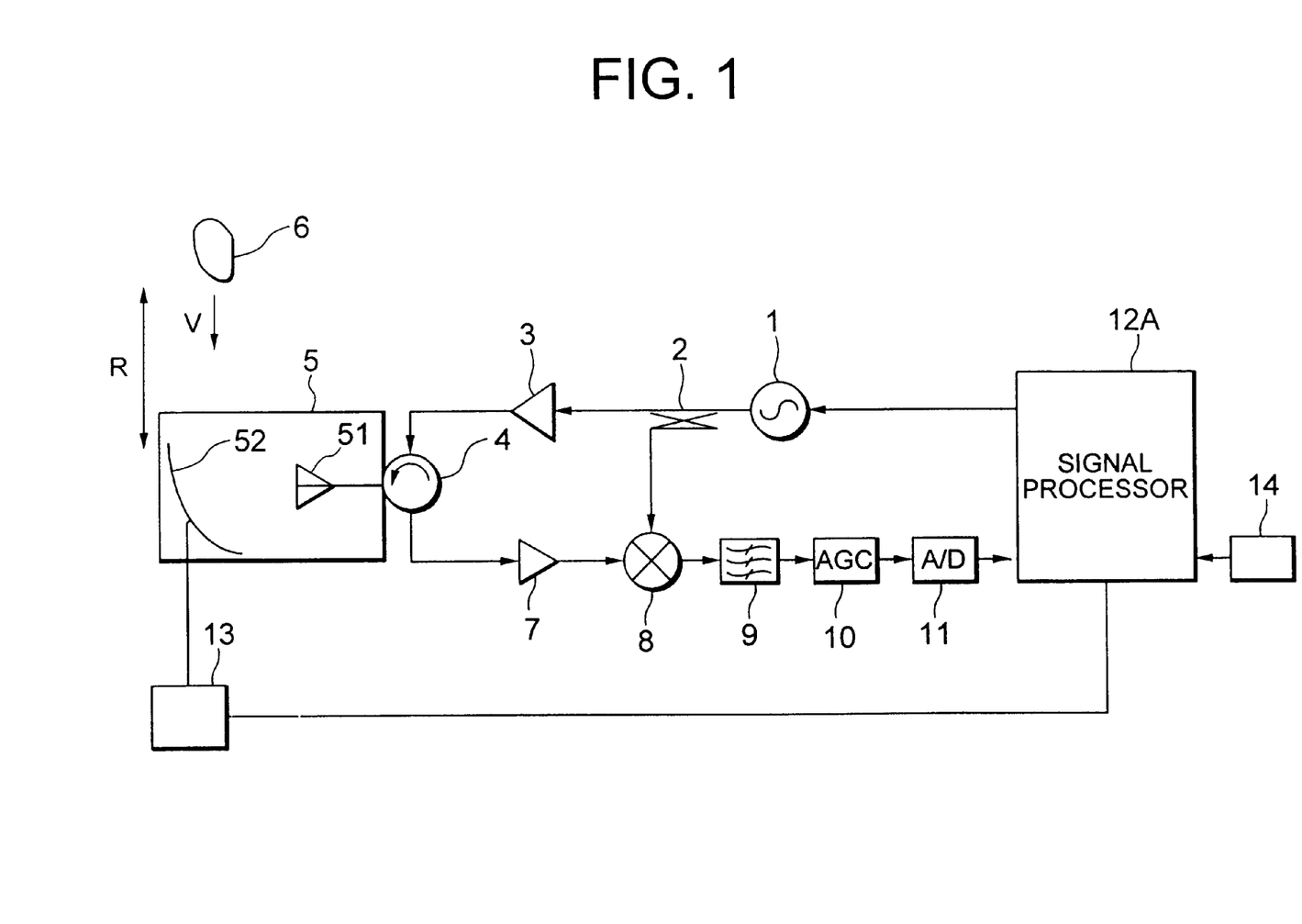
FIG. 1 is a block diagram showing a configuration of a radar system mounted on a vehicle in accordance with embodiment 1 of the present invention.

FIG. 1 is a block diagram showing a configuration of a radar system mounted on a vehicle in accordance with embodiment 1 of the present invention.

Referring to FIG. 1, the same components as those in the prior art illustrated in FIG. 5 are marked with the like reference numerals, and there are shown an oscillator 1, a power divider 2, a transmitting amplifier 3, a circulator 4, a transmit-receive shared antenna 5 including a horn antenna 51 and a reflection mirror antenna 52, a target object 6, a receiving amplifier 7, a mixer 8, a filter 9, an AGC (Automatic Gain Control) amplifier 10, an A/D (Analog-to-Digital) converter 11, an antenna scan motor 13, serving as a scan means, for deflecting a transmitting direction and a receiving direction of the transmit-receive shared antenna 5, and a handle angle sensor 14.

A signal processor designated by a new symbol 12A in embodiment 1, as in the case of the signal processor 12 in the prior art shown in FIG. 5, calculates a relative distance, a relative velocity and a receiving intensity M. The signal processor 12A has, however, such a different point that an angle measuring process is executed based on a combination of the receiving intensities of respective frequency modulated phases in a plurality of directions. Further, the average of the respective measured angle values is determined.

Next, a principle of the angle measuring process according to the present invention will be discussed.

Figure 2A:
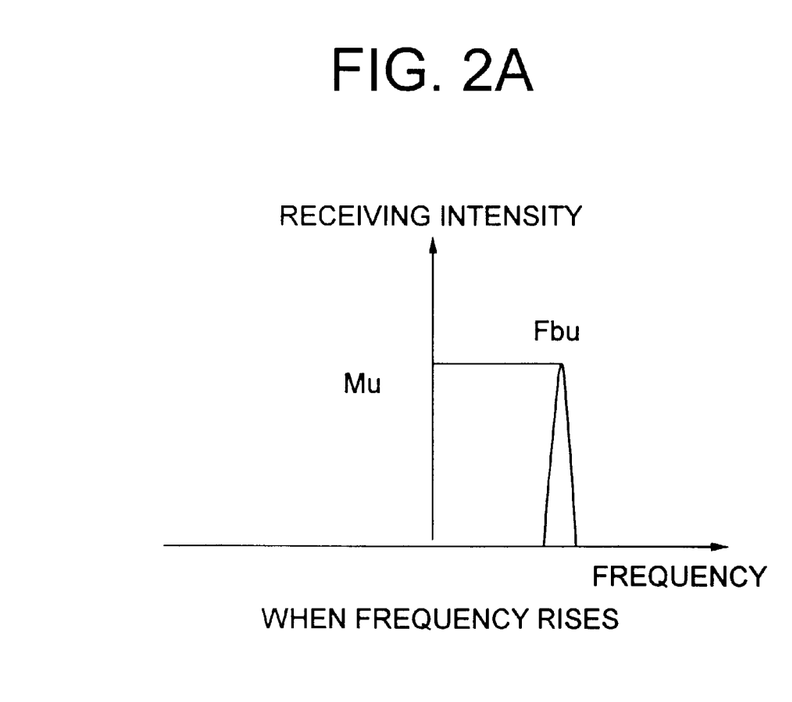
FIGS. 2(A) and 2(B) are explanatory graphs showing relationships between frequencies and receiving intensities in two phases when a linearity is ideal.
Figure 2B:
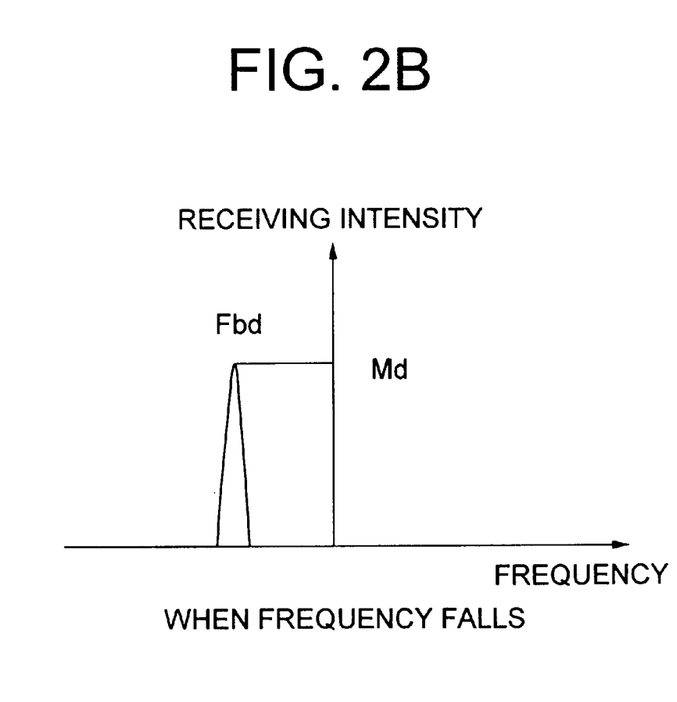
Figure 3A:
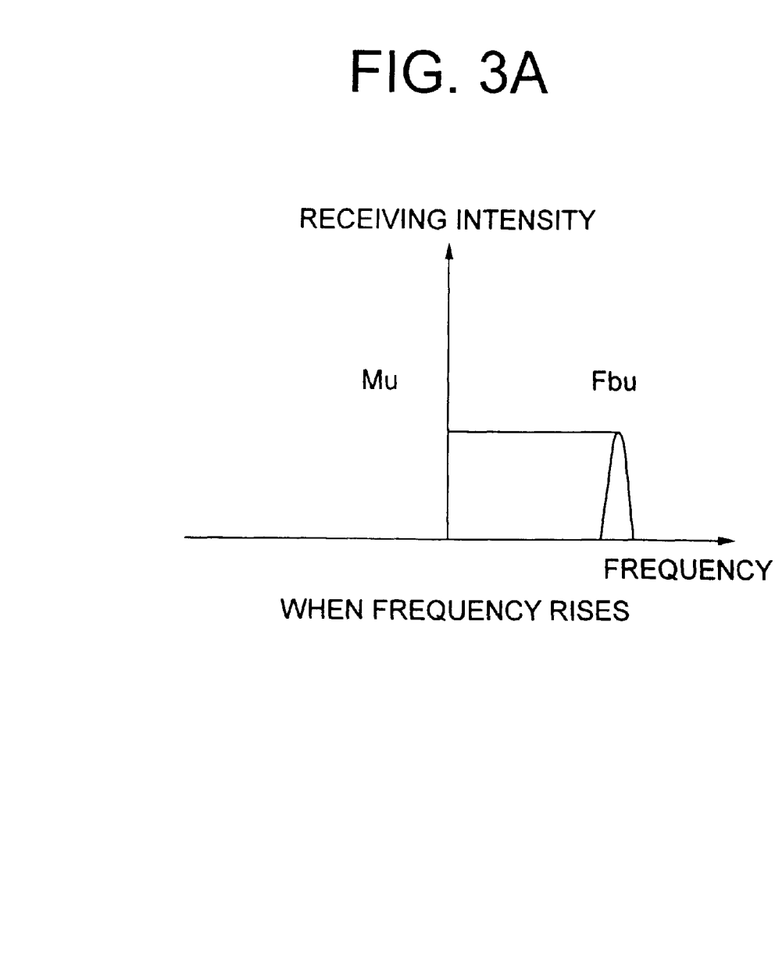
FIGS. 3(A) and 3(B) are explanatory graphs showing relationships between the frequencies and the receiving intensities in the two phases when the linearity is impaired in embodiment 1 of the present invention.
Figure 3B:
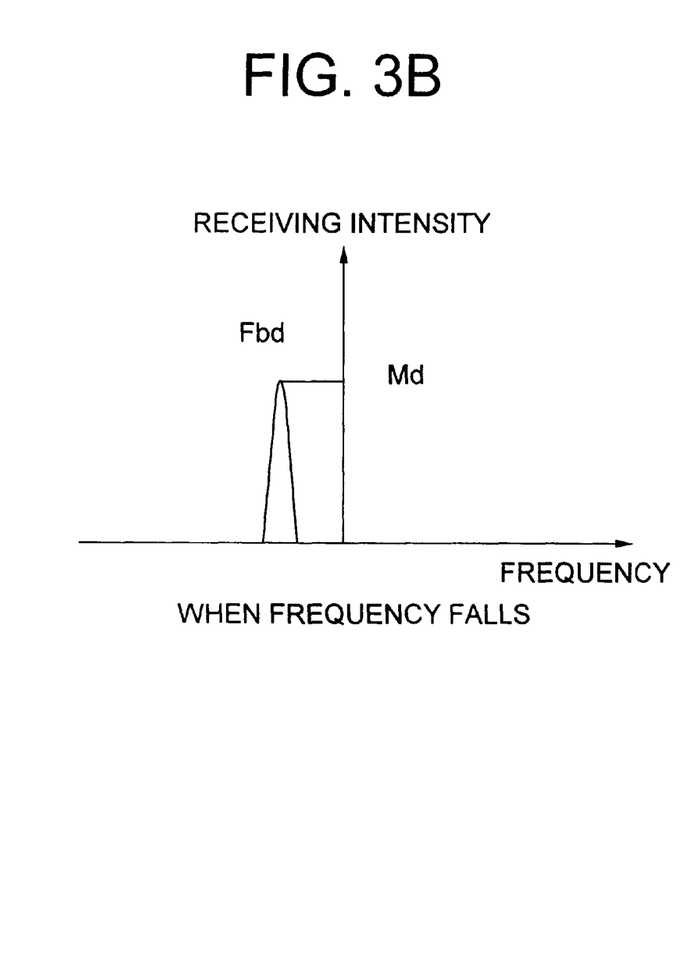

When calculating the relative distance and the relative velocity, if a preferable linearity of the frequency modulation is given in FIG. 6, receiving intensities Mu, Md of beat frequencies Fbu, Fbd, which are obtained by executing an FFT (Fast Fourier Transformation) process, take the same level as shown in FIGS. 2(A) and 2(B). If the linearity is impaired, however, the receiving intensities Mu, Md of the beat frequencies Fbu, Fbd, which are obtained by executing the FFT process, take different levels with an error as shown in FIGS. 3(A) and 3(B). As a result, an error might occur in the measured angle value in principle according to the conventional angle measurement processing method.

This will be elucidated more specifically.

To start with, a definition of the linearity is given. A function f showing a transmitting frequency is defined by way of a quadratic equation, and expressed by the following formula (9):

$$f = f_0 + (M - \alpha T)t + \alpha t^2 \quad (9)$$

where fo is a start-of-modulation frequency, T is a frequency modulation time, t is a time, α is a constant, and M is an ideal frequency change rate linearity.

The function f is determined as in the following formula on the assumption that samplings at 512 points are effected.

$$l = \max \left| 1 - \frac{Mi}{M} \right|_{i=0 \sim 511}$$

$$Mi = \frac{f\left\{\frac{T}{N}(i-1)\right\} - f\left(\frac{T}{N}i\right)}{\frac{T}{N}}$$

where l is a linearity, i is a sample number (0≦i≦511), N is a number-of-samples 512, T is a frequency modulation time 7.1 ms, t is a time, and a is α constant (α>0).

Table 1 shows the decline quantities (dB) of the receiving intensities M at respective bins with respect to the linearity defined above. The bin given herein connotes a minimum resolution of the beat frequency (i.e., the relative distance and the relative velocity). When the modulated frequency is 150 MHz and the frequency modulation time is 7.1 ms, one bin is equivalent to 1m or 1 km/h.

TABLE 1

|  | Linearity 0% | Linearity 1% | Linearity 2% | Linearity 3% | Linearity 5% | Linearity 10% |
| --- | --- | --- | --- | --- | --- | --- |
| 10 bins | 0.00 dB | 0.09 dB | 0.34 dB | 0.75 dB | 1.94 dB | 1.94 dB |
| 20 bins | 0.00 dB | 0.34 dB | 1.30 dB | 1.50 dB | 1.49 dB | 3.89 dB |
| 30 bins | 0.00 dB | 0.75 dB | 1.50 dB | 1.28 dB | 3.28 dB | 5.44 dB |
| 40 bins | 0.00 dB | 1.30 dB | 1.19 dB | 2.16 dB | 3.89 dB | 6.79 dB |
| 50 bins | 0.00 dB | 1.94 dB | 1.49 dB | 3.28 dB | 4.94 dB | 7.62 dB |
| 60 bins | 0.00 dB | 1.50 dB | 2.16 dB | 3.55 dB | 5.44 dB | 8.52 dB |
| 70 bins | 0.00 dB | 1.26 dB | 2.95 dB | 4.07 dB | 6.24 dB | 9.07 dB |
| 80 bins | 0.00 dB | 1.19 dB | 3.31 dB | 4.70 dB | 6.79 dB | 9.73 dB |
| 90 bins | 0.00 dB | 1.28 dB | 3.55 dB | 5.06 dB | 7.29 dB | 10.17 dB |
| 100 bins | 0.00 dB | 1.49 dB | 3.89 dB | 5.44 dB | 7.62 dB | 10.67 dB |

If the linearity thus is impaired, the receiving intensity gets more impaired as the beat frequency becomes larger.

Further, as also understood by observing FIG. 6, when a detected target object has a relative distance and a relative velocity, the beat frequencies Fbu and Fbd are generally different in terms of their absolute values. In this case, as shown in Table 1, the beat frequencies Fbu, Fbd are different and therefore receive different degrees of linearity influence. These beat frequencies, as shown in FIGS. 3(A) and 3(B), have an error in intensities irrespective of the receiving intensity being the same as a reflection intensity from the target object, and take different values. In this state, it follows that the conventional method of measuring the angle from the receiving intensities M in the respective directions might cause an error in the measured angle values in principle.

Furthermore, as discussed above, if the linearity is enhanced, the error in the measured angle might be reduced. The enhancement of the linearity, however, requires increasing a hardware scale and a load on the signal processing. This can not be attained in terms of costs and operation conditions of an automobile.

Under such circumstances, there is provided the angle measuring method capable of minimizing, even if the linearity declines, the influence thereof in accordance with the embodiment 1 of the present invention.

Figure 4:
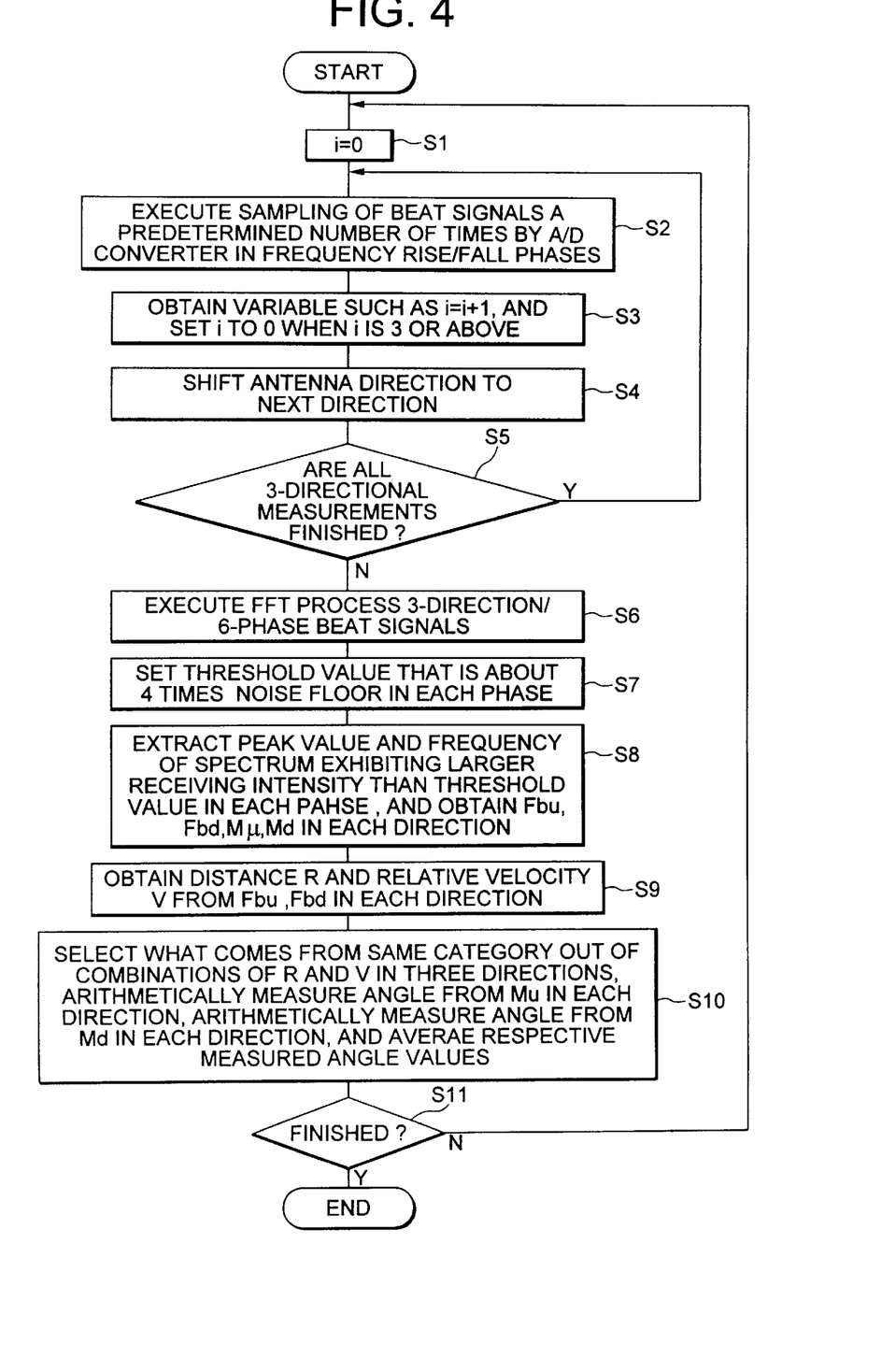
FIG. 4 is a flowchart showing an angle measuring process by a signal processor 12A shown in FIG. 1.

FIG. 4 is a flowchart showing a content of the angle measuring process by the signal processor 12A in embodiment 1.

The angle measuring process in embodiment 1 will hereinafter be described specifically with reference to this flowchart.

To begin with, 3-directional beat signals in two phases when the frequency rises and lowers are obtained in the sampling process by the A/D converter 11 (steps S1~S5). Herein, the number of directions is set to 3(i=3), however, any number of directions may be taken. Further, the number of phases of the frequency rise and frequency fall is different depending on a distance measuring method and a velocity measuring method, however, a one-direction/two-phase mode is herein adopted.

Next, three-direction/six-phase beat signals are subjected to the FET process (step S6), and a threshold value that is approximately 4 times a noise floor is set in all phases with the FET process being executed (step S7). Approximately the 4-fold threshold value is set herein, however, this value might change corresponding to specifications of the radar. Further, the threshold value may also be determined by executing a CFAR (Constant False Alarm Rate) process.

The noise components are eliminated by extracting frequencies and peak values of spectrums exhibiting larger receiving intensities than the threshold value, and the beat frequencies Fbu, Fbd and the receiving intensities Mu, Md in the respective directions are obtained (step S8). Then, the relative distance R and the relative velocity V are obtained as in the prior art from the beat frequencies Fbu, Fbd in the three directions, respectively (step S9).

Next, what comes from the same category is selected from combinations of the relative distances R and the relative velocities V in the three directions (signals from the same target object are picked up), and an angle is arithmetically measured based on a combination of the receiving intensities Mu in the same phase in each direction. Further, an angle is arithmetically measured based on a combination of the receiving intensities Md in the same phase in each direction. Moreover, what averages the respective measured angle values is used as a result of measuring the angle (step S10).

Thus, when the angle measuring processes are executed based on the combinations of the receiving intensities in the respective frequency-modulated phases, if the target object is identical, the beat frequencies Fbu, Fbd detected in each direction are the same, and, if being the same frequencies, the receiving intensities of the beat frequencies Fbu, Fbd in each direction deteriorate at the same ratio as described above even when the linearity might be impaired. Therefore, the ratio of the receiving intensities in each direction, which are needed for the angle measuring process, is not impaired. This makes it feasible to properly measure the angle even when the linearity is impaired.

Moreover, what averages the respective measured angle values is used as the result of measuring the angle, whereby the influence of the noises can be eliminated with the result that the accuracy increases.

As discussed above, according to the present invention, the angle measuring process is executed based on the combination of the receiving intensities in the respective frequency-modulated phases, and therefore, even if the linearity is impaired, the angle can be properly measured. This is attained at a low cost without adding special hardware and increasing the arithmetic load.

Further, what averages the respective measured angle values is used as the result of measuring the angle, whereby the noise influence can be eliminated with the result that the accuracy increases.

What is claimed is:

1. A radar system mounted on a vehicle, comprising:
   a transmitting means for transmitting electromagnetic waves subjected to a plurality of frequency modulations;
   a receiving means for receiving the electromagnetic waves reflected by a target;
   a signal processing means for calculating a relative distance and a relative velocity to the target, a receiving intensity on the basis of a transmitting signal of said transmitting means, a receiving signal of said receiving means, and a direction of said target from the receiving intensity; and
   a scanning means for deflecting a transmitting direction of said transmitting means and a receiving direction of said receiving means on the basis of an output of said signal processing means,
   wherein said signal processing means executes an angle measuring process based on a combination of receiving intensities in frequency-modulated phases in a plurality of directions.

2. A radar system mounted on a vehicle according to claim 1, wherein said signal processing means determines an average of the respective measured angle values.

* * * * *